(12) United States Patent
Sisson

(10) Patent No.: US 12,077,315 B2
(45) Date of Patent: Sep. 3, 2024

(54) TREND DATA FOR AIRCRAFT DISPLAYS

(71) Applicant: Rockwell Collins, Inc., Cedar Rapids, IA (US)

(72) Inventor: James E. Sisson, Palo, IA (US)

(73) Assignee: Rockwell Collins Inc., Cedar Rapids, IA (US)

( * ) Notice: Subject to any disclaimer, the term of this patent is extended or adjusted under 35 U.S.C. 154(b) by 381 days.

(21) Appl. No.: 17/486,606

(22) Filed: Sep. 27, 2021

(65) Prior Publication Data

US 2023/0102023 A1 Mar. 30, 2023

(51) Int. Cl.
*B64D 43/00* (2006.01)

(52) U.S. Cl.
CPC ................... *B64D 43/00* (2013.01)

(58) Field of Classification Search
CPC ........ B64D 43/00; B64D 47/08; B64C 23/00; G01C 23/00; G08G 5/025
USPC ............................................................ 701/3
See application file for complete search history.

(56) References Cited

U.S. PATENT DOCUMENTS

| 10,271,798 | B2 | 4/2019 | Kassem et al. | |
| 10,782,678 | B2 | 9/2020 | LeBlanc | |
| 2002/0140578 | A1* | 10/2002 | Price | G01S 7/24 340/973 |
| 2012/0286975 | A1* | 11/2012 | Thomson | G01C 23/005 340/974 |
| 2013/0100136 | A1 | 4/2013 | Camp et al. | |
| 2013/0245860 | A1* | 9/2013 | Cooper | B64D 45/00 701/14 |
| 2013/0253738 | A1* | 9/2013 | Fucke | B64D 45/00 701/14 |
| 2015/0103735 | A1* | 4/2015 | Bobrek | H04L 47/10 370/316 |
| 2015/0348420 | A1 | 12/2015 | Kneuper et al. | |
| 2018/0194486 | A1* | 7/2018 | Lux | G06F 3/147 |
| 2018/0232097 | A1* | 8/2018 | Kneuper | B64D 47/08 |
| 2018/0338731 | A1 | 11/2018 | Addison et al. | |
| 2020/0180790 | A1* | 6/2020 | Ramaswamy | G07C 5/085 |

OTHER PUBLICATIONS

Extended European Search Report dated Feb. 10, 2023 on European Application No. 22197234.2 filed Sep. 7, 2021.

\* cited by examiner

*Primary Examiner* — Todd Melton
*Assistant Examiner* — Vincent Feng
(74) *Attorney, Agent, or Firm* — Suiter Swantz IP

(57) ABSTRACT

A system and related methods for storing data from avionics sensors and displaying the data on flight display. The data is received from the avionics sensor. The data is recorded in a memory according to a storage period, the storage period based on at least in part on a sampling rate of the signal. Furthermore, the memory may be limited to a fixed amount of data, with the oldest data being replaced with newer data. The data is further displayed on a flight display adjacent to a linear scale, with an orientation and position such that the data corresponds to values on the linear scale. By the data displayed on the flight display, an aircraft operator may visually determine trends regarding in-flight data in minimal time, thereby reducing cognitive workload.

9 Claims, 6 Drawing Sheets

300

TREND DATA FOR AIRCRAFT DISPLAYS

BACKGROUND

Pilots are often required to make decisions based on the behavior of the aircraft or a subsystem in the aircraft. For example, a pilot might have two different procedures related to abnormally high engine temperature, a first procedure to follow if engine temperature is expected to stay the same or decrease, and a second procedure if the pilot determines temperature is likely to increase. In unusual or emergency situations, pilots may have limited time to make decisions, often while dealing with distractions. Due to such distractions, pilots may be unable to determine trend information from digital readouts without observing the information over time. Analog style gauges are an improvement over digital readouts in this regard. Analog style gauges may allow the aircraft operator to observe the motion of an indicator of the analog style gauge to provide a sense of the rate-of-change. However, a period of observation time and mental retention of historical values is required before a conclusion may be drawn. Thus, digital readouts and analog style gauges do not allow a user to immediately observe historical measurements. Therefore, it would be advantageous to provide one or more of a device, system, or method that cures the shortcomings described above.

SUMMARY

Embodiments of the present disclosure are directed to a system. In one embodiment, the system includes at least one flight display configured to display an image. In another embodiment, the system includes a memory. In another embodiment, the system includes a processor coupled to the flight display and the memory. In another embodiment, the processor is configured to execute instructions maintained on the memory. In another embodiment, the instructions cause the processor to receive a signal from an avionics sensor. In another embodiment, the instructions cause the processor to store a portion of the signal in the memory. In another embodiment, the instructions cause the processor to cause the flight display to display the image. In another embodiment, the image includes a linear scale, a pointer, and a plurality of data points. In another embodiment, the linear scale includes an axis. In another embodiment, the pointer is positioned on the axis based on the signal. In another embodiment, the plurality of data points based on the portion of the signal stored in the memory. In another embodiment, the plurality of data points are oriented relative to the axis to indicate a value of the data point on the axis; portion of the signal stored in the memory. In another embodiment, the plurality of data points are positioned from newest to oldest relative to the axis.

Embodiments of the present disclosure are directed to a method. In one embodiment, the method includes receiving, by a processor, a signal from an avionics sensor. In another embodiment, the method includes storing, by the processor, a portion of the signal in a memory. In another embodiment, the method includes causing, by the processor, a flight display to display an image. In another embodiment, the image includes a linear scale, a pointer and a plurality of data points. In another embodiment, the linear scale includes an axis. In another embodiment, the pointer is positioned on the axis based on the signal received to the processor. In another embodiment, the plurality of data points positioned and oriented relative to the axis to indicate the portion of the signal stored in the memory.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION OF EXEMPLARY EMBODIMENTS

Figure 1A:
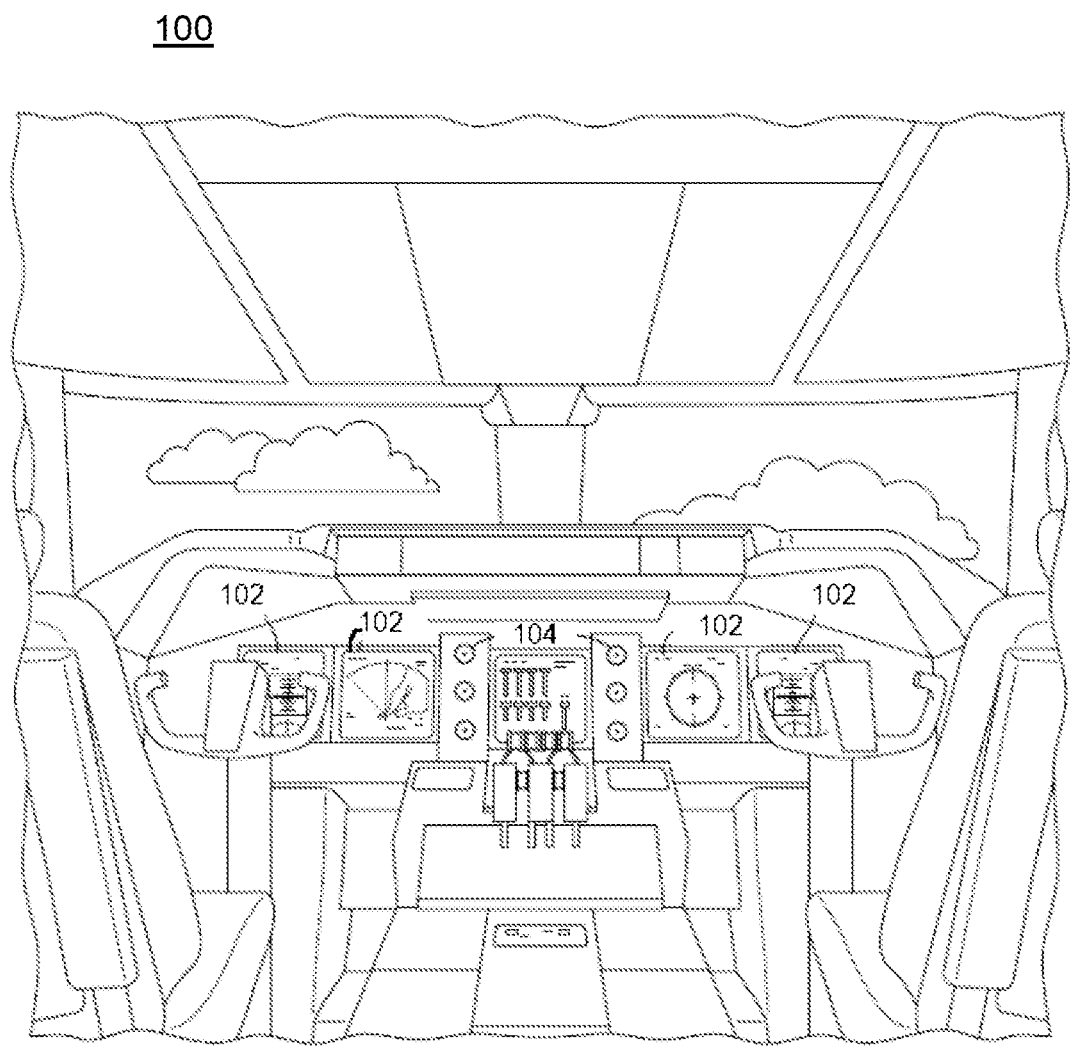
FIG. 1A depicts a simplified view of a control center of an aircraft, in accordance with one or more embodiments of the present disclosure.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive "or". For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination or sub-combination of two or more such features, along with any other features which may not necessarily be expressly described or inherently present in the instant disclosure.

Embodiments of the concepts disclosed herein are directed generally to a system for providing historical information to an aircraft pilot or crew via images displayed on a flight display. As will be appreciated, the images described herein may provide for enhanced situational awareness and simplified guidance for quickly and efficiently understanding an aircraft's condition regarding historical information. The historical information may be received from a sensor as a signal. All or some portion of the signal may be stored in a memory. The signal may be selectively stored based on a desired storage period between measurements to be displayed. The stored sensor measurements may then be displayed adjacent to a scale (e.g., a linear scale; a curvilinear scale) on the flight display. By the stored sensor measurements being displayed adjacent to the scale, pilot comprehension of trends associated with the scale may be greatly accelerated. The oldest stored measurement may then be replaced with the newest measurements, for reducing memory requirements.

Figure 1B:
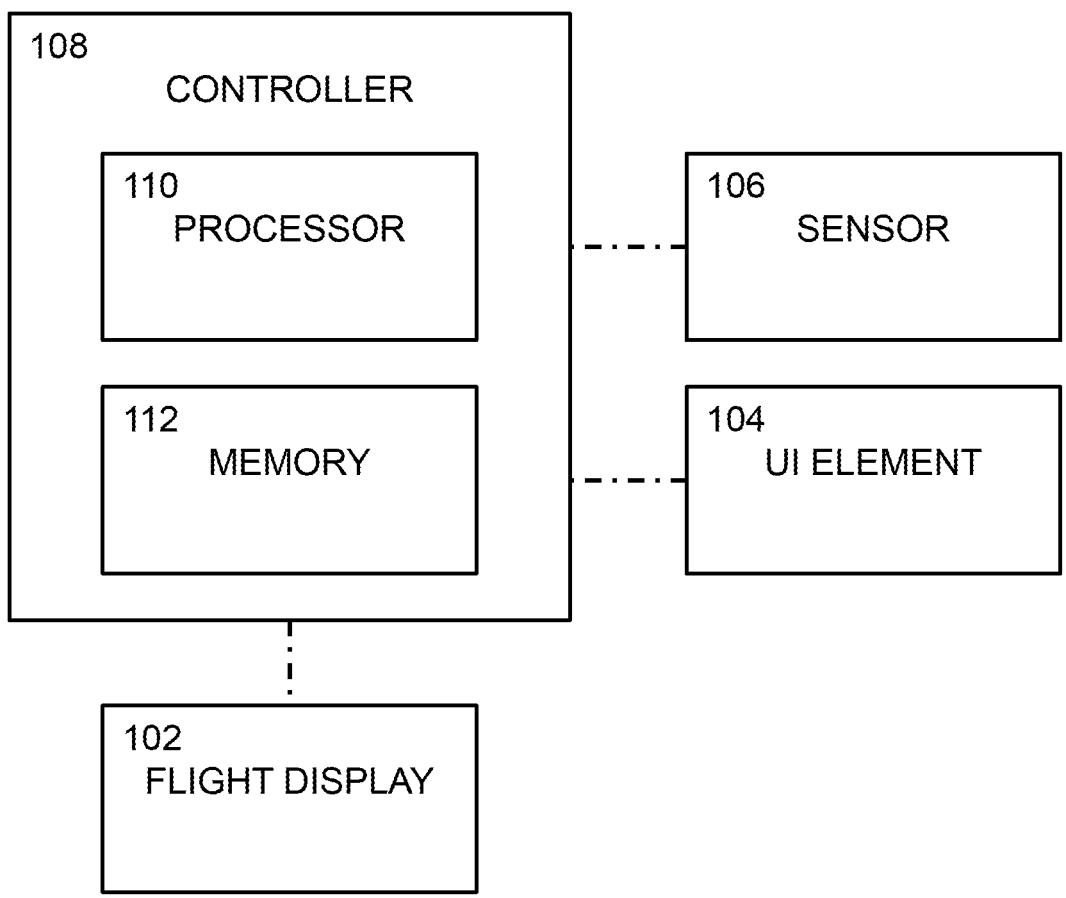
FIG. 1B depicts a simplified control diagram of a system, in accordance with one or more embodiments of the present disclosure.

Referring now to FIGS. 1A-1B, a system 100 is described, in accordance with one or more embodiments of the present disclosure. The system 100 may be embodied as an aircraft control center (or cockpit).

The system 100 may include one or more flight displays 102 and one or more user interface (UI) elements 104. The flight displays 102 may be implemented using any of a variety of display technologies, including CRT, LCD, organic LED, dot matrix display, and others. The flight displays 102 may be navigation (NAV) displays, primary flight displays (PFD), a head-up display, electronic flight bag displays, tablets or tablet computers, synthetic vision system displays, head-up displays (HUDs) with or without a projector, a head-worn display, wearable displays, watches, and so on. The flight displays 102 may be used to provide information to the flight crew, thereby increasing the flight crew's visual range and enhancing their decision-making abilities. The flight displays 102 may be configured to function as, for example, a primary flight display (PFD) used to display altitude, airspeed, vertical speed, navigation and traffic collision avoidance system (TCAS) advisories; a crew alert system (CAS) configured to provide alerts to the flight crew; a multi-function display used to display navigation maps, weather radar, electronic charts, TCAS traffic, aircraft maintenance data and electronic checklists, manuals, and procedures; an engine indicating and crew-alerting system (EICAS) display used to display critical engine and system status data, and so on. Other types and functions of the flight displays 102 are contemplated and will be apparent to those skilled in the art. According to various exemplary embodiments of the inventive concepts disclosed herein, at least one of the flight displays 102 may be configured to provide a rendered image as described further herein. The flight display 102 may then update the image according to a refresh rate of the flight display 102.

In some embodiments, the flight displays 102 update the image based on information from a sensor 106, the sensor 106 based in the aircraft (i.e., an avionics sensor). In some embodiments, the flight displays 102 update the image based on information from one or more of aircraft-based systems, ground-based systems, satellite-based systems, or from systems of another aircraft. In some embodiments, the flight displays 102 provide an output from aircraft-based weather radar systems, LIDAR systems, infrared systems, or other systems on the aircraft. For example, the flight displays 102 may include an avionics display, a joint display, an air traffic display, a weather radar map, and a terrain display. The flight displays 102 include an electronic display or a synthetic vision system (SVS). For example, the flight displays 102 may include a display configured to display a two-dimensional (2-D) image, a three-dimensional (3-D) perspective image, or a four-dimensional (4-D) display. Other views of air traffic information, terrain, and/or weather information may also be provided (e.g., plan view, horizontal view, and vertical view). The views shown on the flight displays 102 may include monochrome or color graphical representations of the displayed information. Graphical representations of the displayed information may include an indication of altitude of other aircraft, weather conditions, or terrain, or the altitude and/or location of such information relative to the aircraft.

The UI elements 104 may include, for example, dials, switches, buttons, touch screens, keyboards, a mouse, joysticks, cursor control devices (CCDs) or other multi-function key pads certified for use with avionics systems. The UI elements 104 may be configured to, for example, allow an aircraft crew member to interact with various avionics applications and perform functions such as data entry, manipulation of navigational maps, and moving among and selecting checklist items. For example, the UI elements 104 may be used to adjust features of the flight displays 102, such as contrast, brightness, width, and length. The UI elements 104 may also (or alternatively) be used by an aircraft crew member to interface with or manipulate the displays of the flight displays 102. For example, the UI elements 104 may be used by aircraft crew member to adjust the brightness, contrast, and information displayed on the flight displays 102. The UI elements 104 may additionally be used to acknowledge or dismiss an indicator provided by the flight displays 102. Further, the UI elements 104 may be used to correct errors on the flight displays 102. Other UI elements 104, such as indicator lights, displays, display elements, and audio alerting devices, may be configured to warn of potentially threatening conditions such as severe weather, terrain, and obstacles.

Referring now to FIG. 1B, a simplified control diagram of the system 100 is described, in accordance with one or more embodiments of the present disclosure. An exemplary embodiment of the system 100 may include the flight display 102 and a controller 108. The controller 108 is configured to receive information from the sensor 106. In some embodiments, the system 100 includes the sensor 106, although this is not intended to be limiting. The controller 108 may further include a processor 110 and a memory 112. It is noted herein that the one or more components of system 100 may be communicatively coupled to the various other components of system 100 in any manner known in the art. For example, the controller 108 may be communicatively coupled to other components (e.g., the flight display 102, the user interface element 104, the sensor 106) via a wireline (e.g., copper wire, fiber optic cable, and the like) or wireless connection (e.g., RF coupling, IR coupling, data network communication (e.g., WiFi, WiMax, Bluetooth and the like). Moreover, different components of the system 100 (e.g., flight display 102, user interface element 104, sensor 106) may include the controller 108, processor 110, or memory 112 for carrying out at least a portion of the steps described throughout the present disclosure. Therefore, the above description should not be interpreted as a limitation on the present disclosure but merely an illustration.

The processor 110 may include any one or more processing elements known in the art. In this sense, the processor 110 may include any microprocessor-type device configured to execute software algorithms and/or instructions. In general, the term "processor" may be broadly defined to encompass any device having one or more processing elements, which execute program instructions from memory 112. It should be recognized that the steps described throughout the present disclosure may be carried out by the processor 110.

The memory 112 may include any storage medium known in the art suitable for storing program instructions executable by the associated one or more processors 110. For example, the memory 112 may include a non-transitory memory medium. For instance, the memory 112 may include, but is not limited to, a read-only memory (ROM), a random-access memory (RAM), a magnetic or optical memory device (e.g., disk), a magnetic tape, a solid-state drive and the like. It is further noted that memory 112 may be housed in a common controller housing with the one or more processors 110. In an alternative embodiment, the memory 112 may be located remotely with respect to the physical location of the processor 110. In another embodiment, the memory 112 maintains program instructions for causing the processor 110 to carry out the various steps described through the present disclosure. In another embodiment, the memory 112 maintains one or more circular buffers for storing signals received from the sensor 106.

The sensor 106 may include a variety of avionics sensors. The sensor 106 may indicate information associated with a flight instrument, such as, but not limited to, attitude, heading, vertical speed, air speed, altimeter, or turn. The sensor 106 may also indicate information associated with an engine instrument, such as, but not limited to, a fuel quantity, oil quantity, oil pressure, oil temperature, tachometer, temperature, braking pressure, braking temperature, among others. The sensor 106 may further indicate information associated with an engine instrument where the aircraft is one or more of a fixed-wing aircraft, a rotorcraft, a reciprocating engine, or a turbine engine. The sensor 106 may also indicate information associated with outside temperatures, such as, but not limited to, a total air temperature (TAT), a static air temperature (SAT), an international standard atmosphere (ISA), or an outside air temperature (OAT). The sensor 106 may also indicate information associated with an electrical system, such as, but not limited to, a battery voltage or a battery stage of charge. Thus, the sensor 106 may include a variety of known avionics sensors. As may be understood, the sensor 106 is not intended to be limited to a specific sensor.

In some embodiments, the sensor 106 measures the information in an analog signal format. In some embodiments, the analog signal is converted into a digital signal, by an analog-to-digital converter. Such analog-to-digital converter may be included with the sensor 106 or may be performed by a module of the processor 110. In some embodiments, the sensor 106 measures the information in a digital signal format. The processor 110 may receive the signal from the sensor 106. In this regard, the signal received may be a digital signal or an analog signal which is then converted to a digital signal by the processor 110.

The digital signal may include a sampling rate. The sampling rate of the digital signal may be dependent upon the type of the avionics sensor (e.g., where the avionics sensor measures the information in a digital signal with the period) or the type of the analog-to-digital converter (where the analog-to-digital converter includes a sampling rate by which the analog signal is converted). For example, the sampling rate may include a frequency between 50 Hz and 10 kHz.

The processor 110 may be configured to store the digital signal in the memory 112. The processor 110 may store the digital signal in memory according to a storage period. The storage period may indicate an amount of time between measurements stored in the memory 112. The storage period may be at least partially based on the sampling rate. For example, each sample of the digital signal may be stored in the memory 112, such that the storage period is equal to the inverse of the sampling rate. However, storing all the samples may result in memory overflow or excess power consumption due to processing requirements. By way of another example, a portion of the samples of the digital signal may be stored the storage period, with the portion being a factor (i.e., a factor other than one) of the sampling rate. As may be understood, appropriate conversions between period and frequencies may occur to determine an allowable storage period. In this present context, the samples are described with the storage period (as opposed to a storage frequency) because the storage period may directly indicate an amount of time between measurements, which may be easier to understand in regards to subsequently displaying the stored information on the flight display 102.

In some embodiments, a fixed number of data points may be stored in memory. The oldest data point may be overwritten by the newest data. Thus, the system 100 may support a storing a number of data points in memory. By the data points, processor 110 and memory 112 usage associated with storing the data points and/or causing the flight display 102 to display an image including the data points may be bounded to prevent inadvertent exceedance of an avionics application's allowed usage. In some embodiments, the controller 108 may store the information in a circular buffer (circular queue, or similar). By storing the information in the circular buffer, the memory 112 may be prevented from being overrun. This is particularly advantageous due to various memory or power constraints associated with avionics systems, especially where signals from multiple sensors are stored in multiple circular buffers in the memory 112. The circular buffer may include a fixed-sized array. As may be understood, the size of the array may include any suitable size, such as, but not limited to, from six to one-hundred, or more. Once the array is full (i.e., each element in the array includes an associated sample from the digital signal) and a new measurement is received, the oldest measurement in the array may be overwritten. Thus, the array may be updated with the newest measurements while maintaining a reduced memory and processing requirement. As may be understood, the circular buffer may include one or more pointers for keeping track of the position in the array. Furthermore, the measurements may be stored in the circular buffer according to the storage period. As may be understood, the size of the array together with the storage period may indicate a duration of time for which historical sensor readings are stored and displayed. In this regard, the duration of time represented by the data points may be inversely proportional to the storage period, such that more sensors measurements are displayed for a smaller duration of time. Similarly, the duration of time may be directly proportional to the size of the array.

During aircraft development it may be convenient to adjust the storage period of different sensors. Because some types of sensor parameters undergo meaningful changes at high rates while others change slowly, different periods of trend data may be necessary for different sensor applications. For example, showing a few seconds of history of engine temperature might be useful. However, a few seconds of history behind a fuel quantity scale may appear to be a flat line, even if there is a fuel leak. Therefore, controlling the storage period may be desirable.

In some embodiments, the storage period and the array size may be preloaded into the memory 112. The preloading may occur by any suitable manner, such as, but not limited to, by a table. The table may provide a method for customization of the historical context provided on the flight display 102. The table may be loaded into the memory 112. For example, the table may be loaded into the memory 112 by a communication interface (not depicted). The communication interface may include wireline-based interface devices (e.g., DSL-based interconnection, cable-based interconnection, T9-based interconnection, and the like). Similarly, the communication interface may include a wireless-based interface device employing GSM, GPRS, CDMA, EV-DO, EDGE, WiMAX, LTE, WiFi protocols, RF, LoRa, and the like. For example, the preloading may occur by an original-equipment manufacturer (OEM) before the controller 108 is installed within the cockpit, by uploading a file to the processor 110 for storage in the memory 112. The manufacturer may be provided with a tool for generating the table. For example, the tool may include the sampling rate of the sensor 106. Based on the sampling rate, the storage period between points may be selectively controlled. In this regard, the tool may prevent the manufacturer from selecting a storage period which is off-frequency from the sampling rate. The table may be considered a Parameter Data Item (PDI) file that can be modified and loaded into the avionics. At run time, the avionics may then reference the table to know how frequently to update the measurements for each sensor.

In some embodiments, one or more of the storage period or the array size may be selectively adjustable in the cockpit. By selectively adjusting the storage period or the array size, the amount of historical context stored in the memory 112 may be controlled. The storage period or the array size may be selectively adjusted in any suitable fashion. For example, the storage period or the array size may be selectively adjusted by a flight test interface. The flight test interface may allow authorized users (e.g., test pilots) to select the storage period or the array size. The flight test interface may be similar with regards to the previously described table. By way of another example, the storage period or the array size may be selectively adjusted in-flight by the user interface element 104. In this regard, the processor 110 may receive an input from the user interface element 104. In response to the input, the controller 108 may adjust the storage period and/or the array size. In some embodiments, the array size is not selectively adjustable in the cockpit. Where the array size is not selectively adjustable in the cockpit, the processor-executable code maintained on the memory 112 may be certified with a given number of memory allocations without regard to possible memory overflow due to adjustments of the array size by the pilot.

Thus, historical sensor readings from the sensor 106 may be stored in the memory 112. The processor 110 may further cause the flight display 102 to generate an image (e.g., image 200a, image 200b, image 300, image 400, etc.). The image may include data points taken from historical sensor readings, together with an indicator of the current sensor reading from the sensor 106. The data points may provide a visual indication to the pilot regarding the history of the associated sensor.

Throughout the flight duration, the processor 110 may continue to receive signals from the sensor 106. The processor 110 may continually store the portions of the signal in memory 112 according to the storage period, and cause the flight display 102 to update the image. Updating the image may include periodically shifting previous data points away from a scale on the image, with the newest data points being added. The image may be periodically updated when the new data points are received. However, shifting the data points on the image when new data points are received may provide a disjointed or choppy viewing experience for the pilot. The processor 110 may optionally cause the flight display 102 to incrementally shift the data points away from the linear scale based on the refresh rate of the flight display 102.

Figure 2A:
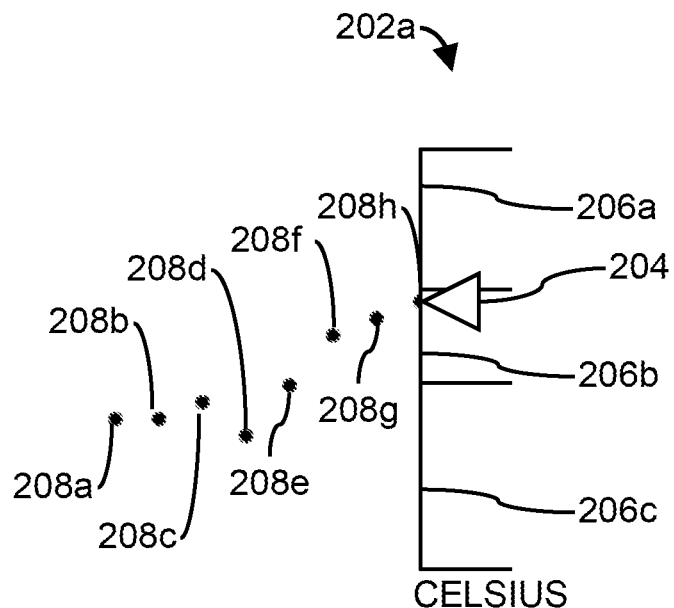
FIG. 2A depicts an image displayed by a system, in accordance with one or more embodiments of the present disclosure.
Figure 2B:
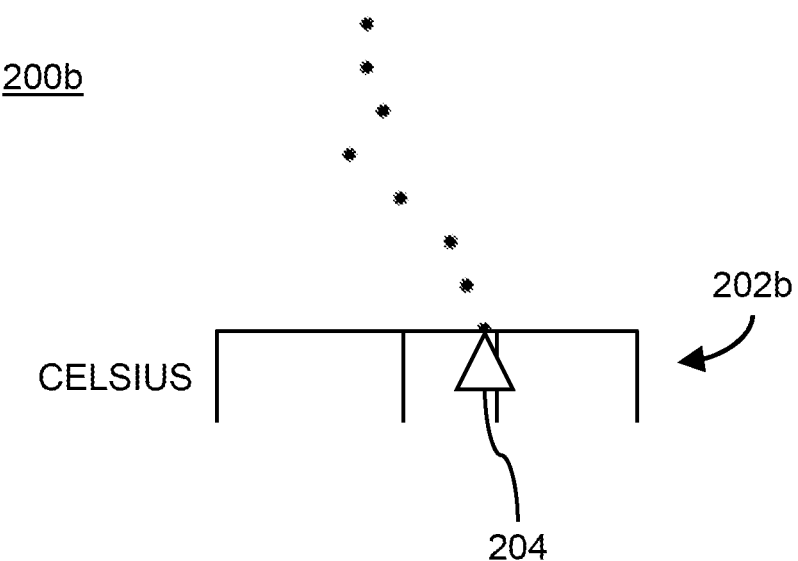
FIG. 2B depicts an image displayed by a system, in accordance with one or more embodiments of the present disclosure.

Referring now to FIG. 2A-2B, exemplary images displayed by the flight display 102 are described, in accordance with one or more embodiments of the present disclosure. The system 100 may display an image 200a, 200b on the flight display 102. The processor 110 may cause the image 200a, 200b to be displayed on the flight display 102.

The image 200a may include a linear scale 202. As may be understood, the term linear scale is not intended to be limited to a scale which represents data in a linear manner. In this regard, the linear scale 202 may represent data in a linear, logarithmic, or other manner. Rather, the term linear scale is meant to include scales with an axis which is linear, as opposed to dial scales with a curvilinear axis.

In some embodiments, the linear scale 202 may be fixed on the image 200a. In this regard, changes in the measurements from the sensor 106 may not affect the linear scale 202 relative to the image 200a. In some embodiments, the linear scale 202 may be a vertical linear scale. In this regard, the vertical linear scale may be oriented such that the linear scale is oriented in the vertical direction. For example, the linear scale 202a is depicted as a fixed-vertical linear scale.

The image 200a may further include a pointer 204. The pointer 204 may include a triangle shape with a vertex oriented at a position on the linear scale 202. The position of the vertex may indicate a current, or more recent measurement received from the sensor 106. The pointer 204 may be a moving pointer, such that changes in the current measurement cause the moving pointer to move along the linear scale 202 (i.e., where the linear scale 202 is fixed). Alternatively, the pointer 204 may be fixed (i.e., where the linear scale is a rolling linear scale).

Although the linear scale 202 is described as being fixed on the image 200a, this is not intended as a limitation of the present disclosure. In this regard, various embodiments of the present disclosure may also extend to the linear scale being a rolling linear scale with a fixed pointer, such as for an airspeed indicator or an altitude indicator.

In some embodiments, the linear scale 202 includes one or more regions 206. For example, the linear scale 202a is depicted as including a region 206a, region 206b, and region 206c. During flight, the image 200a may be represented in color. The regions 206 may include various colors representing various parameter indications to the pilot (i.e., safe, warning, danger, etc.). For example, the image 200a is representative of a brake temperature. The region 206a may be represented by a red color, in which the brake temperature is dangerous. The region 206b may be represented by an amber color, in which the brake temperature is approaching dangerous levels. The region 206c may be represented by a green color, in which the brake temperature is at an acceptable level. As depicted, the pointer 204 indicates the brake temperature measured by the sensor is within the region 206b near the dangerous temperature levels of the region 206a. However, the pointer 204 does not indicate historical information of the temperature by itself. As may be understood, the regions 206 may be dependent upon the type of sensor 106 for which the image 200 is being represented. Furthermore, the linear scale 202 is not intended to be limited to include regions 206.

The image 200a may also include data points 208. For example, the image 200a is depicted as including data points 208a-208h. The data points 208 may be based on the information stored in the memory 112. For the provided example, the data points 208a-208h represent a brake temperature. The storage period between the data points 208a-208h is one-second. The data points 208h may be represented on the linear scale 202a as a current measurement. Thus, a seven-second history of brake temperatures may be displayed to a pilot due to the storage period of one-second, the eight data points, and the data point 208h being the current measurement. By the data points 208a-208h, trends associated with changes in the sensor measurements may be observed. Furthermore, parameters which are gradually approaching a dangerous threshold may be visually determined.

In some embodiments, the data points 208 are disposed adjacent to the linear scale 202 on the image 200. The data points 208 may be disposed above, to the left of, below, or to the right of the linear scale 202. The data points 208 may further be positioned and oriented relative to the linear scale. The position of the data points 208 may be from newest to oldest relative to the linear scale (e.g., the older data points further from the linear scale). The orientation of the data points 208 may be such that the value of the data points are represented on the linear scale. For example, the data points 208a-208h are adjacent and left of the linear scale 202a, with a relative height corresponding to a value (and similarly region 206) on the linear scale 202a. The data points 208a-208e are within the region 206c. The data points 208f-208h are within the region 206b. Furthermore, the pointer 204 is within the region 206b and approaching the region 206a. In this regard, the image 200a may provide a visual indication that something is wrong with the brake temperature, due to the historical brake temperatures increasing towards dangerous levels. Where the flight display 102 is a color display, the data points 208 may be similarly colored to the associated regions 206. For example, the data points 208a-208e may be colored green and the data points 208f-208h may be colored amber.

In some embodiments, the data points 208 may further be connected by a line similar to a connected scatterplot (not depicted). The line may further be drawn to a point on the linear scale 202 at which the vertex of the pointer 204 is located. Where the flight display 102 is a color display, the lines connecting the data points 208 may include a color similar to the region 206 associated with the lines. For example, the lines connecting data points 208a-208e may be colored green. The line connecting data points 208e and 208f may be partially green and partially amber, where the transition from green to amber occurs at the boundary between the region 206c and the region 206b. The lines connecting data points 208f-208h may be colored amber. Thus, trendline colors can be associated with the colors of the parameter indication.

In some embodiments, the processor 110 may selectively control the storage period and/or the number of data points stored in memory 112 (i.e., array size). Changes in the storage period and/or the number of data points may change the image. For instance, increasing the storage period may increases a time between the data points on the image. By way of another instance, increasing the number of data points stored in memory may similarly increase the number of data points displayed on the image. Where the time between data points increases or a number of data points displayed increases, a width taken up by the data points on the flight display 102 may similarly increase. In some embodiments, the processor 110 may fix the width of the region take up by the data points 208 on the image by changing a scale between the data points 208. By fixing the width of the region taken up by the data points 208, the data points 208 may be prevented from overlapping with other symbology on the image 200. This may be advantageous where the pilot may selectively control the storage period and/or the number of data points stored in memory.

Referring now to FIG. 2B, the image 200b is described. The image 200b may be similar to the image 200a. Although the linear scale 202 is described as being a vertical linear scale, this is not intended as a limitation on the present disclosure. In this regard, various embodiments of the present disclosure may also extend to linear scales 202 which are oriented horizontally. For example, the linear scale 202b is depicted as a fixed-horizontal linear scale. The data points 208 of the linear scale 202b may similarly be positioned and oriented such that the value of the data points 208 correspond to the linear scale 202b.

The linear scale 202 may thus include various permutations of fixed linear scales with moving pointers or rolling linear scales with fixed pointers, together with horizontal orientation or a vertical orientation. In some embodiments, the linear scale 202 is a fixed-vertical linear scale with a moving pointer (as depicted in FIG. 2A) or a fixed-horizontal linear scale with a moving pointer (as depicted in FIG. 2B).

Figure 3:
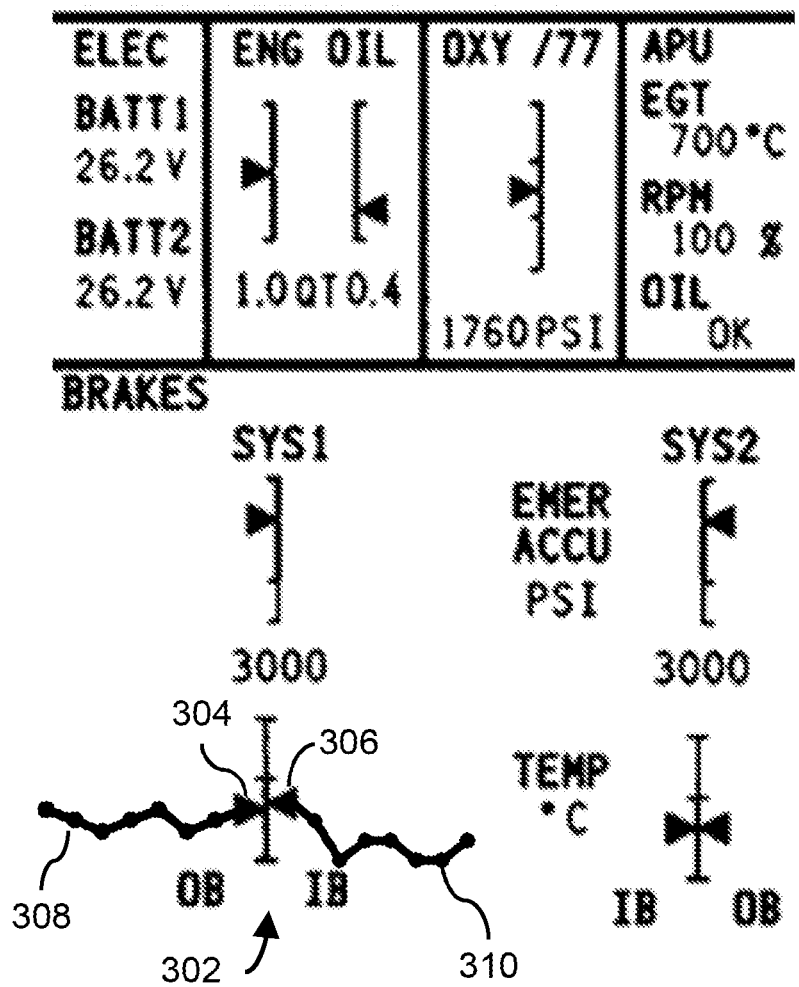
FIG. 3 depicts an image displayed by a system, in accordance with one or more embodiments of the present disclosure.

Referring now to FIG. 3, an image 300 is described, in accordance with one or more embodiments of the present disclosure. As may be understood, the system 100 is not intended to be limited to the image 200a and the image 200b. The system 100 may further display a variety of information. In some embodiments, the processor 110 may receive information from multiple sensors. The processor 110 may further update the flight display 102 with an image based on the information received from such sensors. Such information may include a variety of information from a variety of sensors. In some instances, this image may be known as a synoptic image or a synoptic display. The image 300 may include multiple linear scales, where one or more of the linear scales includes associated data points. In this regard, the memory 112 may include multiple circular array by which measurements may be stored (i.e., a circular array for each sensor). An aircraft may include hundreds, thousands, or even tens-of-thousands of sensors. In some embodiments, historical data for each of those sensors are stored in an associated circular array. For example, the image 300 includes a linear scale 302, including an axis for displaying brake temperatures. The linear scale 302 may include dual pointers, a first pointer 304 and a second pointer 306. The first pointer 304 may be on a first side of the linear scale 302 and correspond to a current measurement from an out-board (OB) sensor. The second pointer 306 may be on a second side of the linear scale 302 and correspond to measurements from an in-board sensor. Data points 308 may be positioned and oriented relative to the axis of the linear scale 302, to indicate measurements from the OB sensor. Data points 310 may be positioned and oriented relative to the axis of the linear scale 302, to indicate measurements from the IB sensor.

Where a linear scale includes dual pointers on opposite sides of the linear scale and data points positioned and oriented to display historical data relative to the linear scale, the data points may be disposed on a same side as the associated pointer, as depicted in FIG. 3. Such display may improve a pilot comprehension when viewing the data points for dual pointers with data points. Thus, although FIG. 2A-2B depict the data points 208a-208h as being on an opposite side of the pointer 204, this is not intended as a limitation on the present disclosure.

Figure 4:
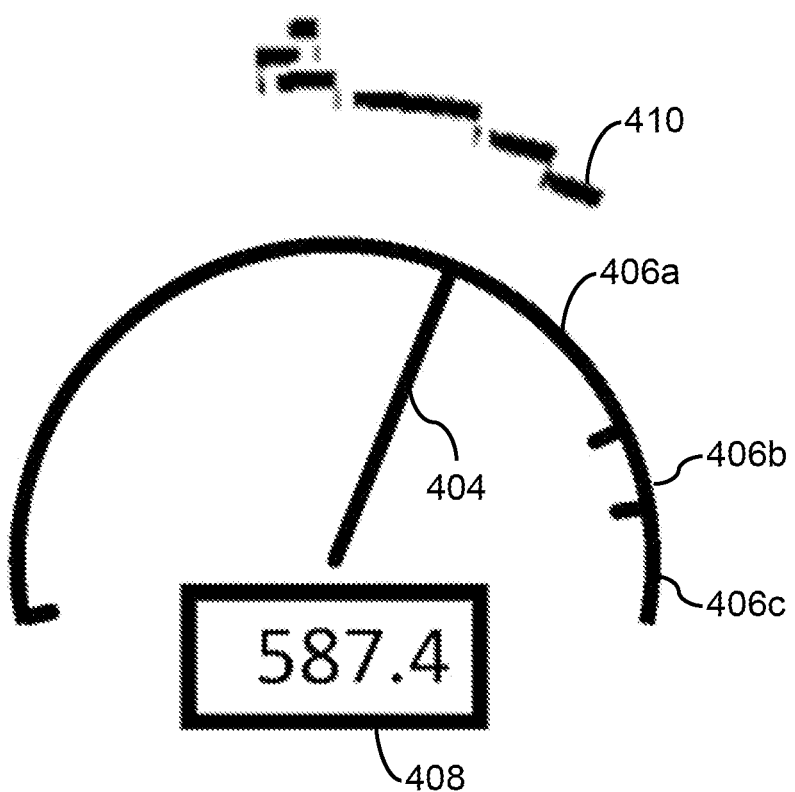
FIG. 4 depicts an image displayed by a system, in accordance with one or more embodiments of the present disclosure.

Referring now to FIG. 4, an image 400 is described, in accordance with one or more embodiments of the present disclosure. As may be understood, the system 100 is not intended to be limited to the previously described images. The system 100 may further display an image with non-linear scales. Although much of the present disclosure has described causing data points to be displayed adjacent to a linear scale, this is not intended as a limitation on the present disclosure. In some embodiments, the flight display 102 may display a dial scale 402, such as for various flight instruments. The dial scale 402 may be a fixed type (as depicted) dial scale or a rolling type dial scale. The image 400 may further include a pointer 404. Where the dial scale 402 is fixed, the pointer 404 may roll to indicate a current sensor measurement. Where the dial scale 402 rolls, the pointer 404 may be fixed to indicate the current sensor measurement. The dial scale 402 may further include one or more regions 406 (e.g., regions 406a, 406b, 406c), similar to the regions 206. The image 400 may further include a digital readout 408 indicative of the current sensor measurement. The image 400 may further includes data points. The data points may be similar to the data points 208 and the data points 308. In this regard the data points may be positioned and oriented relative to the dial scale 402 to provide an indication on the dial scale 402 of the historical sensor measurements. The data points of the image 400 may be similarly positioned from newest to oldest relative to the dial scale 402. However, the axis of the dial scale 402 may be curvilinear, as opposed to the linear axis of the linear scale. In this regard, the processor 110 may cause the flight display to appropriately position and orient the data points relative to the curvilinear axis using a curvilinear coordinate system. Furthermore, the data points may be positioned along the dial scale 402 based on the measured values. In this regard, each data point may be disposed in a separate concentric circle. The data points may also be connected by a trendline 410. The trendline 410 may provide an indication of historical information from the sensor stored in the memory. In particular, the trendline 410 may improve the readability of the image 400 by the pilot.

Figure 5:
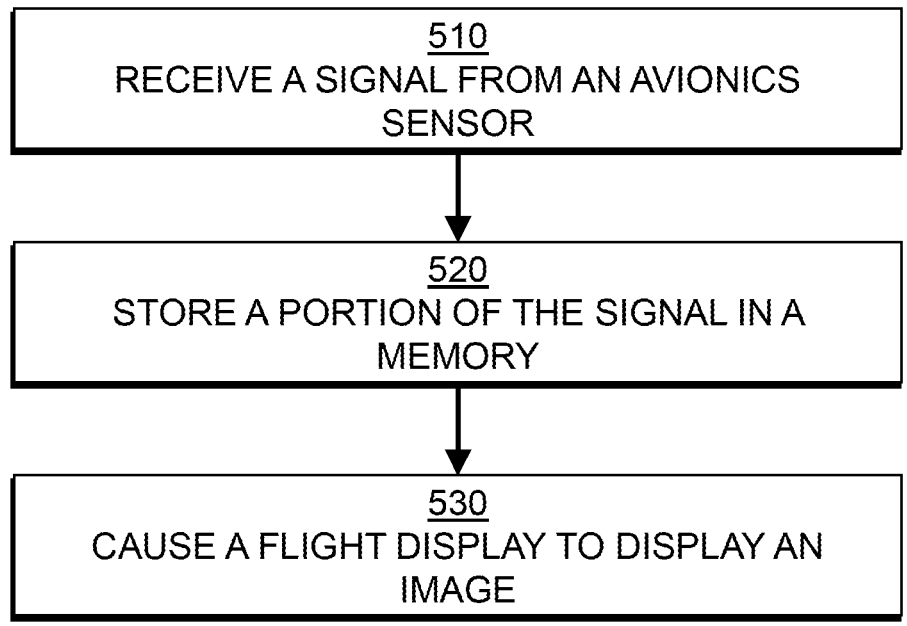
FIG. 5 depicts a flow diagram of a method, in accordance with one or more embodiments of the present disclosure.

Referring now to FIG. 5, a method 500 is described in accordance with one or more embodiments of the present disclosure. The embodiments and the enabling technologies described previously herein in the context of the system 100 should be interpreted to extend to the method 500. For example, the method 500 may be implemented by the processor 110. In this regard, the memory 112 may be considered to include software for selectively storing sensor measurements and causing the sensor measurements to be displayed on the flight display 102. It is further recognized, however, that the method 500 is not limited to the system 100.

In a step 510, a signal is received from an avionics sensor. The signal may be received by a processor. The signal may include a digital signal with a sampling rate.

In a step 520, a portion of the signal is stored in a memory. The portion of the signal may be stored in the memory by the processor. The portion of the signal may be selectively stored based on a storage period. Such storage period may further be based, at least in part, on the sampling rate of the digital signal. In some embodiments, a fixed number of data points may be stored in the memory. For example, the memory may include a circular buffer with a fixed-sized array in which the data points may be stored. The newest data point may overwrite the oldest data point in the buffer.

In a step 530, a flight display is caused to display an image. The flight display may be caused to display the image by the processor. The image may include one or more of a linear scale, a pointer, and a plurality of data points. The linear scale may include an axis. The linear scale may include a fixed linear scale. The linear scale may further include a vertical orientation or a horizontal orientation. The pointer may be positioned on the axis based on the signal received by the processor. The plurality of data points may be positioned and oriented relative to the axis to indicate the portion of the signal stored in the memory. As may be understood, the orientation of the linear scale may similarly change the orientation of the data points, where the data points are oriented relative to the axis. The flight display may further be caused to update the image when new data points are received and stored in the memory.

The method described herein may include storing results of one or more steps of the method embodiments in memory. The results may include any of the results described herein and may be stored in any manner known in the art. The memory may include any memory described herein or any other suitable storage medium known in the art. After the results have been stored, the results can be accessed in the memory and used by any of the method or system embodiments described herein, formatted for display to a user, used by another software module, method, or system, and the like. Furthermore, the results may be stored "permanently," "semi-permanently," temporarily," or for some period of time. For example, the memory may be random access memory (RAM), and the results may not necessarily persist indefinitely in the memory. It is further contemplated that each of the embodiments of the method described above may include any other step(s) of any other method(s) described herein. In addition, each of the embodiments of the method described above may be performed by any of the systems described herein.

Referring generally again to FIGS. 1A-5.

From the above description, it is clear that the inventive concepts disclosed herein are well adapted to carry out the objectives and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

I claim:

1. A system, comprising:
    at least one flight display configured to display an image;
    a memory; and
    a processor coupled to the flight display and the memory;
        the processor configured to execute instructions maintained on the memory causing the processor to:
        receive a signal from an avionics sensor;
        store a portion of the signal in the memory; and
        cause the flight display to display the image; the image including a scale, a pointer, and a plurality of data points; the scale including an axis; the pointer positioned on the axis based on the signal; the plurality of data points based on the portion of the signal stored in the memory; wherein the plurality of data points are oriented relative to the axis to indicate a value of the data point on the axis; portion of the signal stored in the memory; wherein the plurality of data points are positioned from newest to oldest relative to the axis;
        wherein a fixed number of data points are stored in the memory, wherein a newest data point is configured to replace an oldest data point in the memory;
        wherein the data points are stored in a circular buffer of the memory, the circular buffer including a fixed-size array; and
        wherein the fixed-size array is selectively adjustable when the processor is installed in a cockpit.

2. The system of claim 1, wherein the flight display is one of a primary flight display, a head-up display, or a head-worn display.

3. The system of claim 1, further comprising the avionics sensor, wherein the avionics sensor indicates information associated with an engine instrument.

4. The system of claim 1, wherein the signal received from the avionics sensor is a digital signal with a sampling rate.

5. The system of claim 4, wherein the portion of the signal is stored according to a storage period, the storage period based at least in part on the sampling rate.

6. The system of claim 1, wherein the fixed-size array is selectively adjustable by uploading a table to the processor.

7. The system of claim 1, wherein the scale is a linear scale, wherein the linear scale is fixed, wherein the pointer is a moving pointer.

8. The system of claim 1, wherein the scale is a dial scale, wherein the dial scale is fixed, wherein the pointer is a moving pointer.

9. The system of claim 1, comprising a user interface element; wherein the fixed-size array is selectively adjustable in-flight by the user interface element.

* * * * *